United States Patent [19]

Murphy

[11] Patent Number: 4,882,816
[45] Date of Patent: Nov. 28, 1989

[54] RESILIENT RETAINER FOR ELONGATE OBJECTS OF DIFFERENT DIAMETERS AND WIDTHS

[76] Inventor: Kent D. Murphy, 8 Windermere Gilford Road, Sandymount, Dublin 4, Ireland

[21] Appl. No.: 277,975

[22] Filed: Nov. 30, 1988

[51] Int. Cl.⁴ .............................................. B43K 23/00
[52] U.S. Cl. ...................................... 24/555; 24/11 CT
[58] Field of Search .................... 24/555, 552, 11 CT, 24/11 R, 11 PP, 10 R, 10 A; 248/74.2

[56] References Cited

U.S. PATENT DOCUMENTS

| | | | |
|---|---|---|---|
| 333,590 | 1/1886 | Benson | 24/11 CT |
| 637,889 | 11/1899 | Parker | 24/11 PP |
| 1,102,242 | 7/1914 | Carence | 24/11 CT |
| 3,313,009 | 4/1967 | Beckerer | 248/74.2 |
| 3,636,595 | 1/1972 | Wines | 24/555 |
| 3,660,873 | 5/1972 | Kawashima | 248/74.2 |
| 4,655,424 | 4/1987 | Oshida | 248/74.2 |
| 4,691,883 | 9/1987 | Kurihara | 248/74.2 |
| 4,805,479 | 2/1989 | Brightwell | 248/74.2 |

FOREIGN PATENT DOCUMENTS

| | | | |
|---|---|---|---|
| 941104 | 4/1956 | Fed. Rep. of Germany | 248/74.2 |
| 2623040 | 11/1977 | Fed. Rep. of Germany | 248/74.2 |
| 985375 | 3/1965 | United Kingdom | 248/74.2 |

Primary Examiner—Victor N. Sakran
Attorney, Agent, or Firm—Brady, O'Boyle & Gates

[57] ABSTRACT

Elongated objects of varying widths and diameters are held between holding surfaces attached perpendicularly to a back wall, with at least one of said surfaces being formed on the convex side of a resilient arcuate member which member is biased toward the other holding surface and is positioned in spaced relationship to said back wall by an extension and brace which attach said member to said back wall, which back wall can be attached to another area by double-backed adhesive or screws. Said resilient member has a flare incorporated thereon, which flare is positioned opposite said back wall and joins and is angled away from said holding surface, such that a said elongated object, when pressed into said flare, causes said flare to transfer said pressure to said incorporated resilient member, causing said member and the second holding surface to move away from each other and allow said elongated object to become positioned between same and be held there by resilient pressure, until such time as it is removed by pulling it out in the opposite direction from which it was inserted, which removal causes said members and holding surfaces to resiliently bias to a position nearer each other.

11 Claims, 3 Drawing Sheets

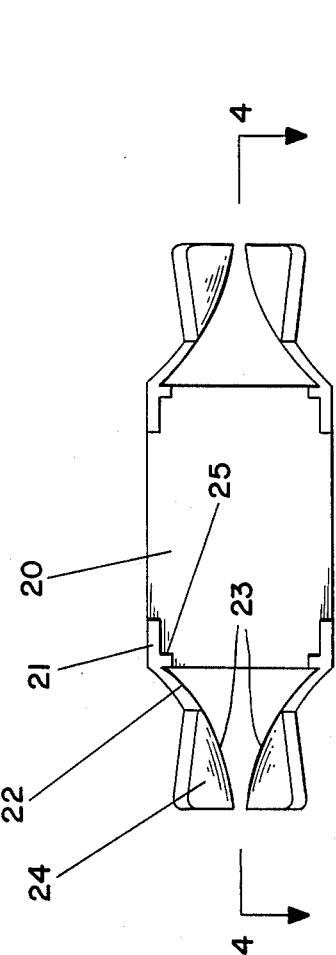
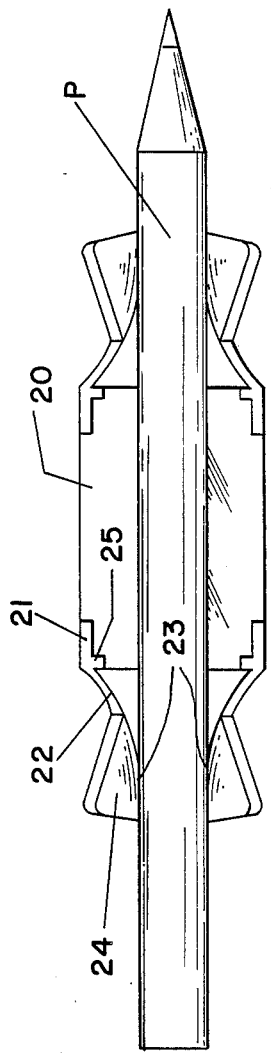
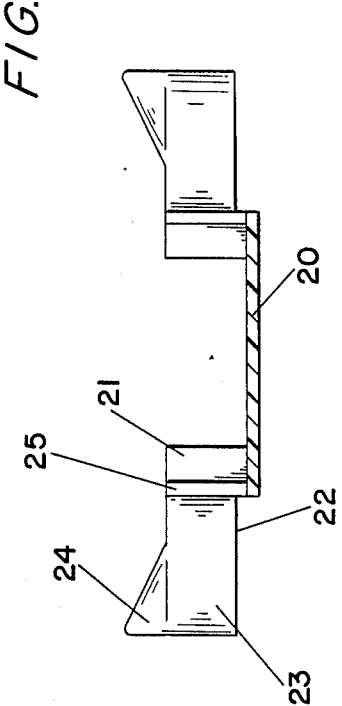
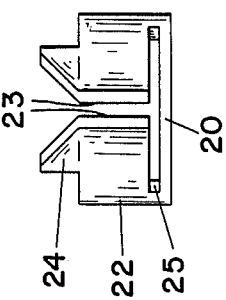

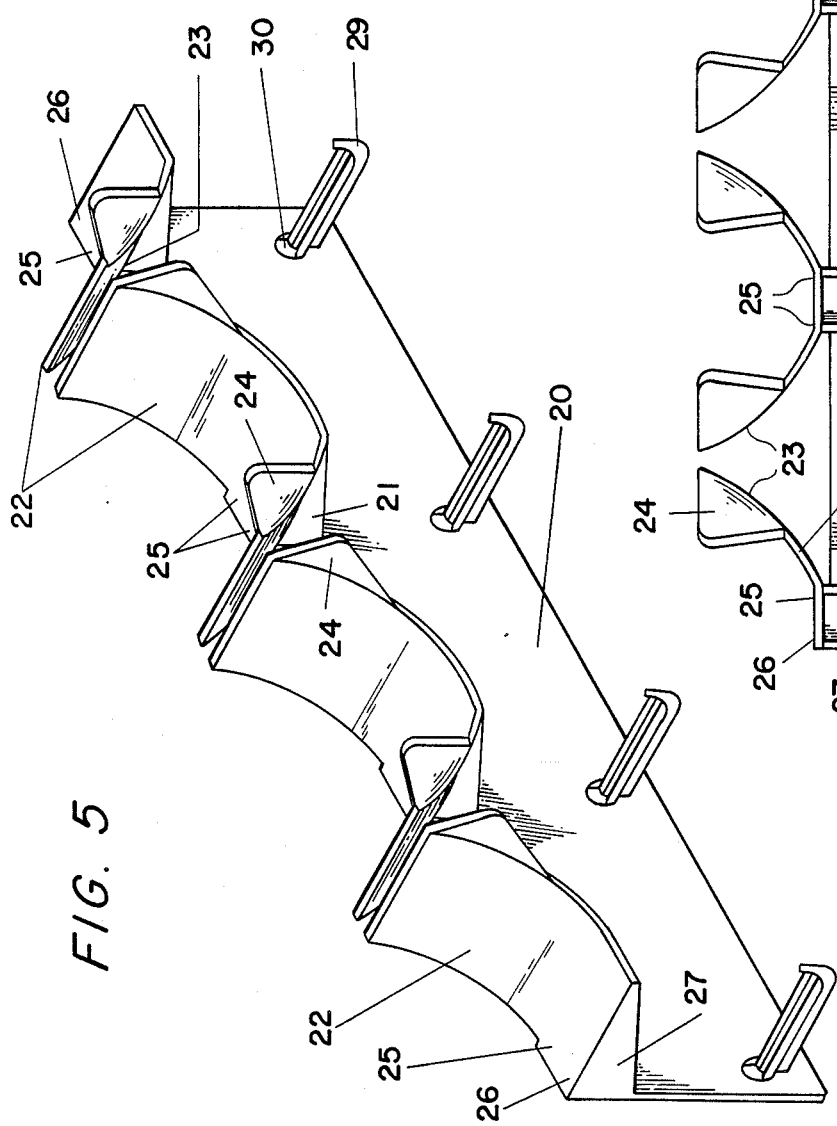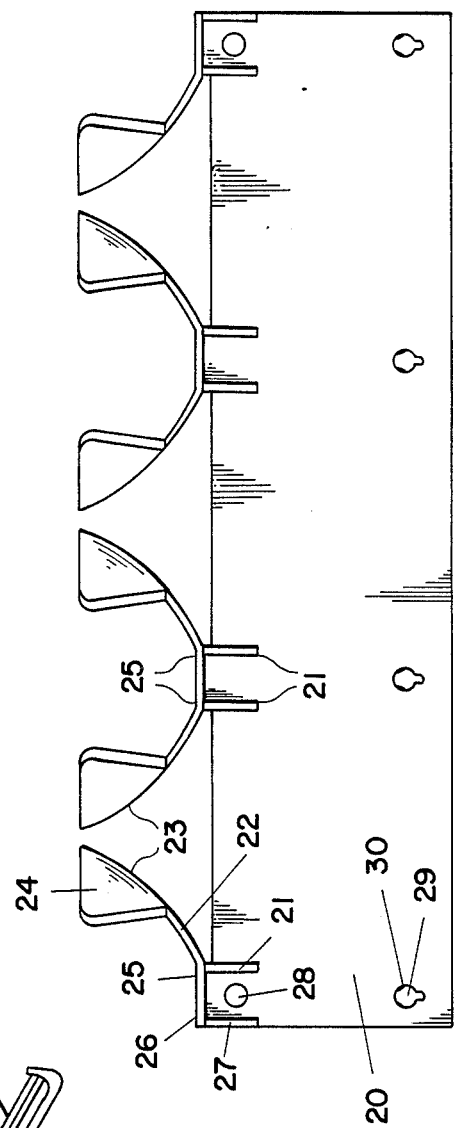

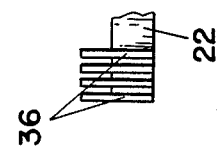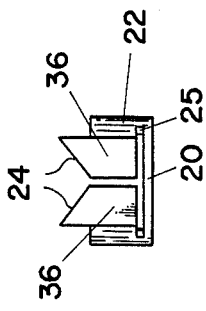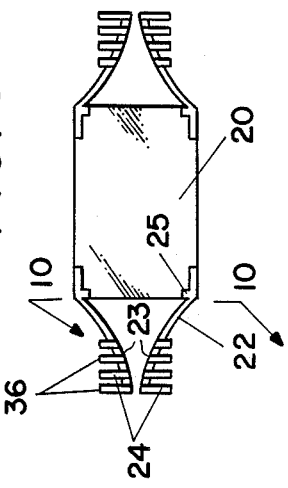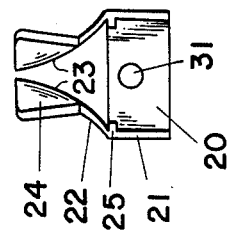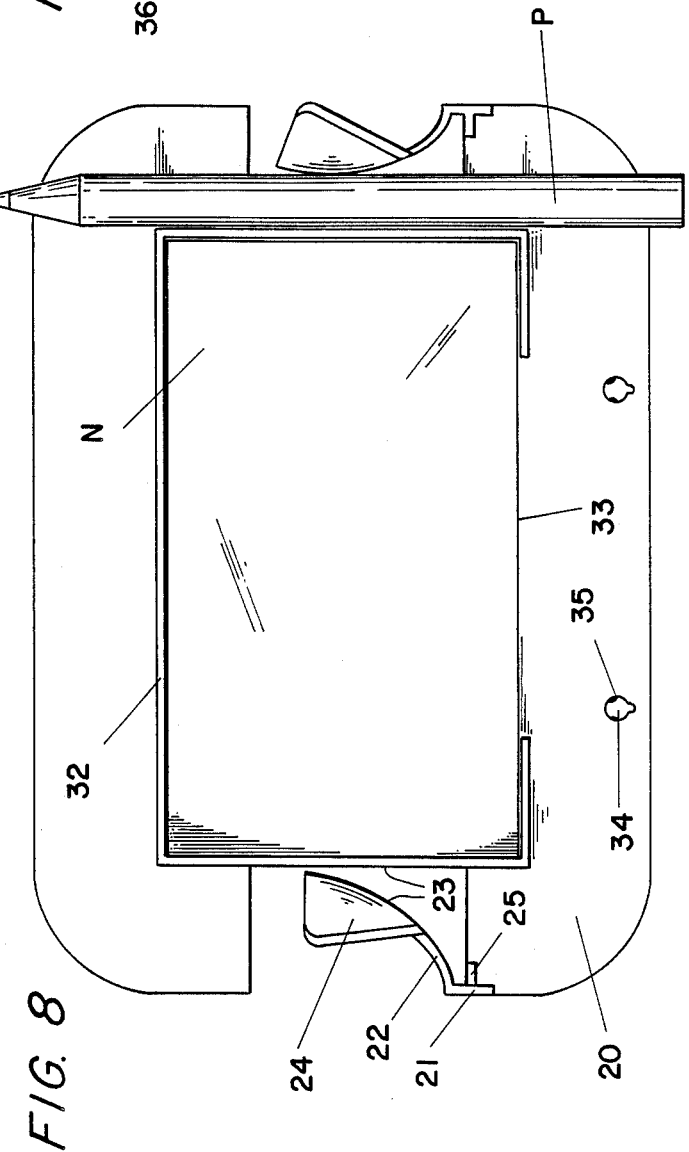

RESILIENT RETAINER FOR ELONGATE OBJECTS OF DIFFERENT DIAMETERS AND WIDTHS

BACKGROUND OF THE INVENTION

The present invention seeks to provide a clip type holder device which holds elongated objects of varying widths and diameters, and which is more convenient, versatile, and effort saving than known clip type holder devices in the prior art. More particularly, it is the object of the invention to provide a clip type holder device having a back wall which may be affixed or integrally joined to another object to provide two holding surfaces between which an elongated object may be resiliently held between said holding surfaces, at least one of which surface is incorporated on an arcuate resilient member biased toward the other surface and which member is positioned in spaced relationship to said back wall permitting it to move in a directional plane parallel to the plane of said back wall when moving away from or toward the second member when either accepting or releasing a held elongated object, respectively.

Another object of the invention is to provide a clip type holder device permitting an elongated object to be held by holding surfaces separating and closing in a directional plane parallel to a back wall and requiring minimum effort to remove said held elongated object, which is removed by slipping same from between said holding surfaces, and represents an improvement over known clips in the prior art, which hold elongated objects by pressure from enclosing means, requiring effort to be applied to open said enclosing means to remove said held elongated object.

Another object of the invention is to provide a clip type holder device manufacturable in molded plastics or stamped metal, and which can be an independent product or which can be a feature of a larger product.

Other features and advantages of the invention will become apparent during the course of the following detailed description.

BRIEF DESCRIPTION OF THE DRAWINGS

FIG. 1 is a plan view of a clip type holder device according to the present invention embodied as a product to hold pens/pencils of varying widths and diameters.

FIG. 2 is a view similar with FIG. 1 with a pen/pencil shown being held.

FIG. 3 is an end view of the embodiment shown in FIG. 1.

FIG. 4 is a cross-sectional side view along line 4—4 of FIG. 1.

FIG. 5 is a perspective view of another embodiment of the present invention as an element of a kitchen/hardware product which includes hooks.

FIG. 6 is a plan view of FIG. 5.

FIG. 7 is a plan view of still another embodiment of the present invention as a product to hold a single hardware/kitchen type item.

FIG. 8 is a plan view of another embodiment of the present invention as an element of a note-keeping product which holds note pads and a pen/pencil.

FIG. 9 is a plan view of a structural variation represented being applied on FIG. 1.

FIG. 10 is a fragmentary side view along line 10—10 of FIG. 9.

FIG. 11 is an end view of FIG. 11.

DETAILED DESCRIPTION

Referring to the drawings in detail wherein like numerals designate like parts, and referring initially to FIGS. 1 through 4, a clip type holder device according to the present invention that holds pens/pencils of varying widths and diameters.

The device is of unitary molded construction in a plastic material such as polypropylene, and consists of a back wall 20 from which perpendicularly project paired supporting extensions 21 and supporting braces 25 attached to which extensions 21 are biased together paired arcuate resilient members 22 in spaced relationship to said back wall which members provide surfaces 23 on their facing convex sides and which members have integral flares 24 which adjoin said surfaces 23 and extend therefrom in an angular manner in a direction away from said back wall 20 and each other. Said members 22 are sufficiently wide to provide surfaces 23 wide enough to grip the elongated pen/pencils intended to be held, and said flares 24 are of substantially the same thickness of said members 22 and extend from approximately one-half to three-quarters the length of said surfaces 23. Extensions 21 and braces 25 are positioned such as to not interfere the inserting of pen/pencils into said surfaces 23 for holding.

Insertion of a pen/pencil P into said holder as shown in FIG. 2 is accomplished by pushing said pen/pencil P into said flares 24 which transfer said pushing pressure to their integrally adjoined members 22 which separate under said pressure and permit said pen/pencil P to slide along said flares 24 into contact with the adjoining surfaces 23 where the pen/pencil P is then held between said surfaces 23 by bilateral parallel pressure applied by said members 22. Removal of said pen/pencil P is effected by simply slipping it from between said surfaces 23 after which resilient biasing of said members 22 move said surfaces 23 closer together.

Two sets of paired extensions 21, braces 25, members 22, holding surfaces 23, and flares 24, are positioned at opposing ends of said back wall 20 and face away from each other in such manner that a held pen/pencil P is simultaneously held at both its ends by two clip devices, permitting the device to be positioned either vertically, horizontally, or upside down and still securely hold the pen/pencil P. Double-sided tape is affixed to the reverse side of said back wall 20 to effect said positioning.

FIGS. 5 and 6 show another embodiment of unitary molded construction serving as a kitchen/hardware product wherein an array of members 22, holding surfaces 23, and flares 24 are positioned along the length of the top edge of said back wall 20 by extensions 21 and braces 25, which braces 25 are adjoined to braces 25 of an adjacent extension 21 or are adjoined to concealment means 26 and 27 for screw fixing holes 28 at either end of said back wall 20. Positioned beneath said supports 25 along the bottom edge of said back wall 20 are hooks 29 integrally molded to said back wall 20 through openings 30 in said back wall 20. Elongated objects hung from said hooks 29 beneath said braces 25 do not interfere with and are adjacent to elongated objects held by said members 22.

FIG. 7 shows still another embodiment of unitary molded construction serving as kitchen/hardware product that holds one elongated object with members 22, holding surfaces 23, and flares 24 connected by extensions 21 and braces 25 to a back wall 20 having a centrally located screw fixing hole 31.

FIG. 8 shows yet another embodiment of unitary molded construction serving as a pen/notepad/hook wall mounted product wherein a back wall 20 has perpendicular walls 32 providing a centrally located rectangular enclosure for a notepad N with a gap 33 in said walls 32 for fingertip removal of sheets from said notepad N which notepad N is held in position by friction from said walls 32, and which walls 32 on either side form stationary holding surfaces 23 to oppose holding surfaces 23 on convex sides of single members 22 arcuately biasing toward said stationary walls 32, which members 22 are attached to extensions 21 supported by braces 25 which are both attached to said back wall 20. Along the bottom edge of said back wall 20 are hooks 34 integrally molded to said back wall 20 through openings 35 in said back wall 20. The product is affixed to a wall by double-backed adhesive on the reverse side of said back wall 20. A pen/pencil P is shown held on one side of the product.

FIGS. 9 through 11 show a variation applied to the pen/pencil holder shown in FIGS. 1 through 4 where flares 24 take the form of a series of projections 36 on the concave side of members 22 which projections 36 are parallel to and run substantially the width of said members 22 and extend beyond said width to rise angularly above said members 22 to form said flares 24, which flares 24 thus formed are separated by gaps which increase the flexibility of said resilient members 22.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. A clip type holder device, comprising a back wall, a pair of holding members connected to said back wall and extending outwardly at right angles to said back wall, said pair of holding members spaced from each other and having facing holding surfaces, at least one of said members of said pair of holding members being a flexible resilient member having a free end biased toward the other member of said pair of members and adapted to flex about a connection axis at the opposite end at right angles to said back wall, a flare portion on said one member adjacent the free end thereof, said facing holding surface of said one member being convex and spaced from said back wall and operative to move apart from the facing holding surface of said other member against the biasing force in a directional plane parallel with said back wall when an elongated object having a longitudinal axis at right angles to the connection axis is pressed into the flare portion to a position between said facing holding surfaces to be held therebetween.

2. A clip type holder device as defined in claim 1, where said one member moves in spaced relationship with said back wall and in a directional plane parallel with said back wall and said other member is stationary.

3. A clip type holder device as defined in claim 2, where said stationary member is incorporated into an object having a function beyond that of a clip type holder device.

4. A clip type holder device as defined in claim 1, where said back wall is incorporated into an object having a function beyond that of a clip type holder device.

5. A clip type holder device as defined in claim 1, where multiple pairs of said holding members are connected on and share a single back wall.

6. A clip type holder device as defined in claim 1, in which both members of said pair of holding members are each a flexible resilient member having a free end biased toward the other member of said pair of members and adapted to flex about a connection axis at the opposite end at right angles to said back wall, and a flare portion on each of said members adjacent the free end thereof, and said facing holding surface of each member being convex and spaced from said back wall, and both members operative to move apart from each other against their respective biasing force in a directional plane parallel with said back wall to hold between said facing holding surfaces an elongated object having a longitudinal axis at right angles to the connection axis of each of said holding members.

7. A clip type holder device as defined in 6, where said flare portions are walls of the approximate thickness of their attached members and which flare portions connect to said members and extend approximately one-half of the length of said members.

8. A clip type holder device as defined in claim 6, where said flare portions are a series of projections from the non-opposing side of said members and which extend and angle upward and outward to function as flares and which projections have gaps between adjacent projections on a member whereby said member can resiliently flex in said gaps.

9. A clip type holder device as defined in claim 6, in which said flare portions on opposite members of said pair of holding members are angled outwardly from said members and away from each other, and adapted to receive an elongated object pressed into the angled apart flare portions.

10. A clip type holder device as defined in claim 6, including plural pairs of said holding members connected on said back wall.

11. A clip type holder device as defined in claim 6, including a second pair of holding members connected to said back wall in spaced opposed relation to said first mentioned pair of holding members.

* * * * *